Patented May 5, 1925.

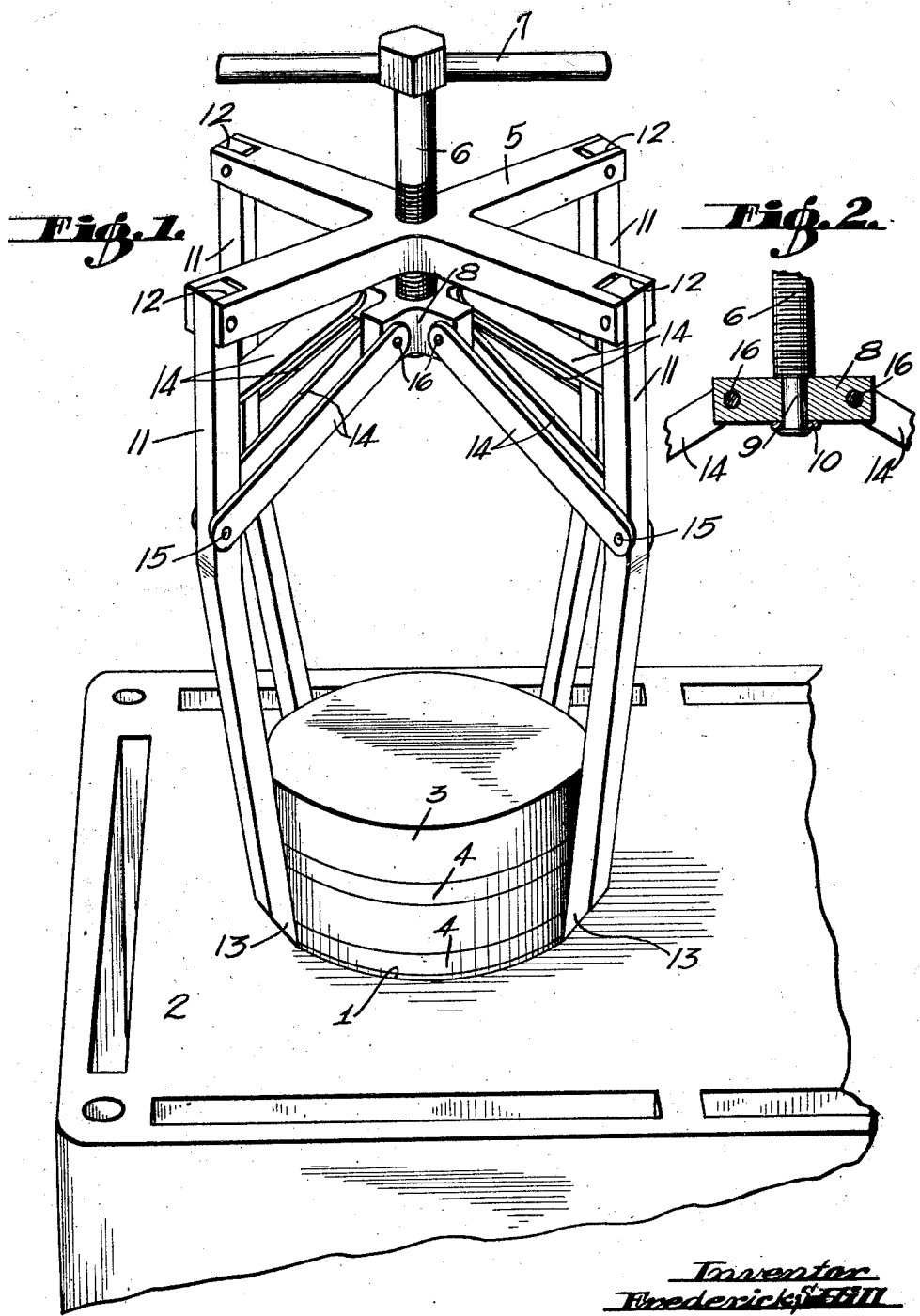

1,536,496

UNITED STATES PATENT OFFICE.

FREDERICK S. HILL, OF GLENDALE, CALIFORNIA.

PISTON-RING COMPRESSOR.

Application filed May 26, 1921. Serial No. 472,629.

*To all whom it may concern:*

Be it known that I, FREDERICK S. HILL, a citizen of the United States, residing at Glendale, in the county of Los Angeles and State of California, have invented new and useful Improvements in Piston-Ring Compressors, of which the following is a specification.

This invention is a tool employed in connection with piston rings for compressing said rings into the grooves of a piston while the piston is being inserted in a cylinder.

It is the specific object of the invention to provide a device of this character of extremely simple construction, but which will be positively actuated to both contract and expand the arms of the device which engage the piston rings to compress the same in the piston grooves.

The positive actuating means for the arms of the compressor is so arranged as to obtain the desired power with a minimum effort, and the provision of a positive expanding as well as positive contracting means for the arms provides for the ready removal of the tool as soon as a piston ring, seated in a groove of the piston, has been started into the cylinder.

It is a further object of the invention to provide a construction affording means for continuing the compression of a piston ring to any necessary degree, without hindering said action by abutment of the tool against any part of the piston other than the ring which is being compressed.

The invention will be readily understood from the following description of the accompanying drawings, in which:

Figure 1 is a perspective view showing the tool in operative position.

Fig. 2 is a detail section through the operating connection between the actuating bolt and the toggle arms of the tool.

The improved tool is illustrated as employed in connection with the piston rings 4 adapted to be received in usual grooves of a piston 3 which is shown as being inserted in a cylinder 1 of an engine block 2.

The tool comprises circumferentially spaced and axially extending arms which are provided with a suitable operating means for positively expanding and contracting the free ends of the arms. The arms are received over the piston and the tips of the arms engage a piston ring so as to compress the same, and thereby allow the piston to be inserted into its cylinder until the piston ring, which is being compressed, has started into the bore of the cylinder. The arms of the tool may then be quickly and positively expanded to remove the device and permit the same to be subsequently employed upon the next upper ring of the piston.

In the present embodiment of the invention the tool is shown as comprising a spider 5 having the operating bolt 6 threaded through the same and provided at its outer end with a cross handle 7 for manually turning said bolt. A spider 8 is journaled upon the inner end of the operating bolt so as to axially shift said spider without causing rotation of the same. For this purpose the end of bolt 6 forms a bearing pin 9 having spider 8 received thereon and held in position by an end washer 10 which may be riveted to the bearing pin.

The operating arms of the tool are shown at 11 and are pivoted at their upper ends in suitable recesses 12 provided in the arms of spider 5. The spider is of such diameter, and arms 11 are so arranged relative thereto, as to provide for receiving the arms over a piston of any size with which the tool is adapted to be used, with said arms in radial spaced relation from the piston. The lower ends of the operating arms are inclined toward one another, and the ends of the arms are tapered as shown at 13, so that when said arms are contracted for compressing a piston ring, as shown in Fig. 1, the tips of the arms engage said ring, while the remaining portions of the arms are still radially spaced from the piston, in order that the contractive force will be exerted entirely against the piston ring, and may be continued to any necessary degree, without the main portions of the arms abutting against the piston. The piston ring as thus compressed, may be started into the bore of cylinder 1 with the edges formed by the tapering ends 13 of the operating arms received against the mouth of the bore of the cylinder.

The positive operating connection for either contracting or expanding the arms of the tool includes toggle arms 14 connecting the arms 11 and the spider 8. The toggle arms are shown as pivoted to arms 11 as by the pins 15 and to the spider 8 as by the pins 16, and the toggle connection between the spider and each arm 11 preferably includes two spaced arms pivoted to the respective sides of an arm of the spider and to the respective sides of the arm 11.

It will be noted that the construction, as thus described, provides means for positively expanding and contracting the operating arms 11 with a minimum effort and through turning of handle 7, since turning of said handle will thread the bolt 6 back and forth through spider 5 and thereby operate the toggle connection so as to swing arms 11 back and forth upon their pivots. As a consequence the tool provides a means for not only positively contracting the arms of the same so as to compress a piston ring in its groove, but also affords means for positively expanding the operating arms so as to readily disengage the tool from the piston ring after it has been started into the cylinder.

It will further be noted that by making spider 5 of a diameter adapting the arms 11 pivoted thereto, to be readily received over any usual piston, with said arms spaced from the piston and the inwardly inclined free ends of the arms adapted to engage a piston ring on the piston, the piston ring will be compressed when the arms are contracted, and the arms 11 will not limit the contractive force exerted against the ring through abutment of the same against the piston.

Various changes may be made without departing from the spirit of the invention as claimed.

What is claimed is:

1. A piston ring compressor comprising longitudinally extending arms adapted to be received over a piston and piston ring carried thereby, said arms being inwardly inclined at one end, and means for contracting said arms with the tips of said inclined arm ends engaging and compressing said piston ring and the remaining portions of said arms in transversely spaced relation from said piston.

2. A piston ring compressor comprising a support, longitudinally extending arms carried by said support, said support and arms being arranged whereby the latter may be received over a piston and piston ring carried thereby, the ends of said arms remote from said support being inwardly inclined, and means for contracting said arms with the tips of said inclined arm ends engaging and compressing said piston ring and the remaining portions of said arms in transversely spaced relation from said piston.

3. A piston ring compressor comprising a support, longitudinally extending arms pivoted to said support, said support and arms being arranged whereby the latter may be received over a piston and piston ring carried thereby, the swinging ends of said arms being inwardly inclined, an operating bolt extending through said support, and a toggle connection between said bolt and said arms for contracting said arms with the tips of said inclined arm ends engaging and compressing said piston ring and the remaining portions of said arms in transversely spaced relation from said piston.

In testimony whereof I have signed my name to this specification.

FREDERICK S. HILL.